United States Patent
Poudrier

(10) Patent No.: US 9,925,928 B2
(45) Date of Patent: Mar. 27, 2018

(54) VERSATILE ROOF MOUNTED CARGO AND RECREATION SYSTEM

(71) Applicant: Alan Stanley Poudrier, Niceville, FL (US)

(72) Inventor: Alan Stanley Poudrier, Niceville, FL (US)

(*) Notice: Subject to any disclaimer, the term of this patent is extended or adjusted under 35 U.S.C. 154(b) by 78 days.

(21) Appl. No.: 14/946,752

(22) Filed: Nov. 19, 2015

(65) Prior Publication Data

US 2017/0144609 A1    May 25, 2017

(51) Int. Cl.
| | |
|---|---|
| *B60R 9/00* | (2006.01) |
| *B60R 9/045* | (2006.01) |
| *E04H 15/06* | (2006.01) |
| *E04H 15/46* | (2006.01) |
| *E04H 15/48* | (2006.01) |
| *E04H 15/54* | (2006.01) |

(52) U.S. Cl.
CPC ............. *B60R 9/045* (2013.01); *E04H 15/06* (2013.01); *E04H 15/46* (2013.01); *E04H 15/48* (2013.01); *E04H 15/54* (2013.01)

(58) Field of Classification Search
CPC ......... B60R 9/045; E04H 15/06; E04H 15/46; E04H 15/48; E04H 15/54
USPC ............... 224/486, 309, 310, 314, 321, 325
See application file for complete search history.

(56) References Cited

U.S. PATENT DOCUMENTS

| | | | | |
|---|---|---|---|---|
| 4,063,659 A * | 12/1977 | Welch | .................. | B60P 3/1025 193/38 |
| 5,108,141 A * | 4/1992 | Anderson | ................. | B60R 9/00 211/182 |
| 5,586,856 A * | 12/1996 | Springer | ................... | B60P 3/10 414/462 |
| 5,904,463 A * | 5/1999 | Christensen | ............ | B60R 9/042 224/310 |
| 5,964,565 A * | 10/1999 | Skotzky | ................. | B60R 9/042 224/309 |
| 6,152,339 A * | 11/2000 | Kreisler | .................... | B60R 9/00 224/309 |
| 6,279,801 B1 * | 8/2001 | Harrison | ................. | B60R 9/042 224/310 |
| 6,286,739 B1 * | 9/2001 | Stapleton | ............... | B60R 9/045 224/309 |
| 6,338,427 B1 * | 1/2002 | Aftanas | ................... | B60R 9/045 224/309 |
| 7,458,490 B2 * | 12/2008 | Klinkman | .............. | B60R 9/045 224/321 |
| 8,308,035 B2 * | 11/2012 | Polewarczyk | .......... | B60R 9/045 224/321 |
| 8,485,403 B2 * | 7/2013 | Stahl | ...................... | B60R 9/045 224/321 |

(Continued)

*Primary Examiner* — Peter Helvey

(57) ABSTRACT

A versatile roof mounted cargo and recreation system is comprised of a tubular framework that provide a means for securing and transporting articles on the roof of a vehicle. The tubular framework also provides longitudinal channels which allow various accessories to be stored within the framework of the roof mounted carrier and which accessories can be arranged and fastened in a variety of configuration to serve multiple purposes such as adjusting the position of support members to support the weight of a removable hardtop for lifting and removing the hardtop and also for adjusting the position of the support members to support a canopy that is attached to the vehicle.

7 Claims, 5 Drawing Sheets

(56) References Cited

U.S. PATENT DOCUMENTS

| 8,496,146 B2* | 7/2013 | Badillo | B60R 9/045 224/310 |
| 2011/0101056 A1* | 5/2011 | Barkey | B60R 9/052 224/321 |
| 2013/0015218 A1* | 1/2013 | Surkin | B60R 9/048 224/309 |

* cited by examiner

VERSATILE ROOF MOUNTED CARGO AND RECREATION SYSTEM

BACKGROUND OF THE INVENTION

1. Field of the Invention

The present invention relates to a device that functions as a roof rack that is attached to a vehicle's roof for transporting articles or cargo and the device can convert to other useful functions such as a framework used to remove a detachable hard top from the vehicle and also convert to canopy shade.

2. Background of the Prior Art

Many sport utility vehicle (SUV) and pickup truck owners find that they lack sufficient capacity to transport articles such as surfboards, kayaks, and cargo. Owners turn to roof mounted carriers in order to increase the capacity of the vehicle to transport articles and cargo. Such roof mounted carriers, which come in varying architectures, are attached to the top of the vehicle.

Roof mounted carriers are very versatile in increasing the cargo capacity of the vehicle to which such carriers are attached. However, such carriers are a unitary function article in that they serve no other purpose other than increasing the capacity of a vehicle by providing a method to transport articles and/or cargo on the roof of the vehicle. However, the carriers tend to offer little further utility to their use. Often the user has other recreational intentions for a Sport Utility Vehicle (SUV) such as removing a removable hard top from the vehicle or setting up and securing a pop-up canopy to the vehicle for shade when recreational tailgating. Such additional needs can either be met by having an assistant aid in removing the hardtop or setting up and securing a shade canopy. However, such need resolutions either require time-consuming and often difficult manual labor on the part of the user or his or her entourage, or the carrying of additional cargo which may require sacrificing other desired articles from being transported.

Accordingly, there is a need in the art for a device that can increase the overall utility of a typical roof mounted carrier so that the carrier has substantial utility to a user beyond the primary function of transporting cargo. Such a device must provide support for a variety of articles in order to reduce the need for time-consuming and difficult manual labor. Such a device must be of relatively simple construction and be easy to use.

SUMMARY OF THE INVENTION

The versatile roof mounted cargo and recreation system of the present invention addresses the aforementioned needs in the art by providing a comprehensive carrier, wherein the framework of versatile roof mounted cargo and recreation system is able to support and secure a variety of elongate articles and also serve as a framework for recreational accessories such as a canopy, or the framework can be used to lift and remove a vehicle's removable hardtop (or truck bed cap). The versatile roof mounted cargo and recreation system is of relatively simple design and construction, being produced using standard manufacturing techniques, so as to make the device relatively inexpensive to produce so as to make the invention economically attractive to potential consumers of this type of device. The versatile roof mounted cargo and recreation system is quickly and easily converted to a desired architecture for a particular job in short order, using at most basic handle tool to perform the conversion.

BRIEF DESCRIPTION OF THE DRAWINGS

Similar reference numerals refer to similar parts throughout the several views of the drawings.

DESCRIPTION OF THE PREFERRED EMBODIMENT

Figure 1:
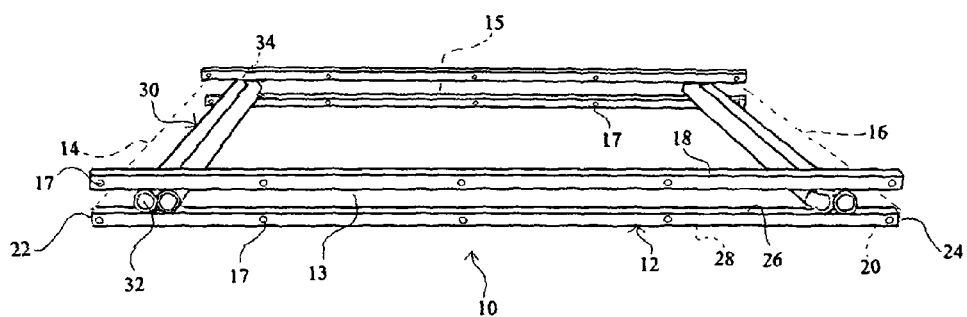
FIG. 1 is a perspective view of the tubular frame of the versatile roof mounted cargo and recreation system of the present invention.
Figure 2:
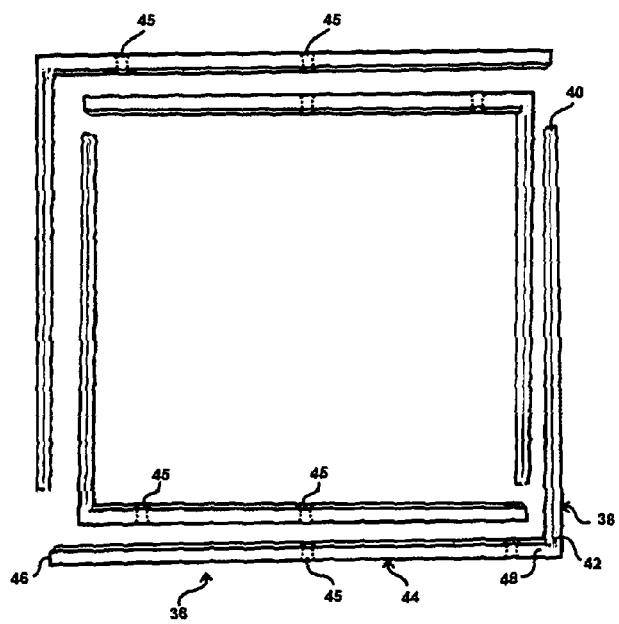
FIG. 2 is a top perspective view of the arm/leg assemblies.
Figure 3:
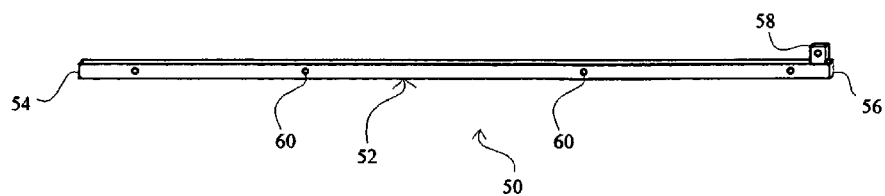
FIG. 3 is a perspective view of the leg extension.
Figure 4:
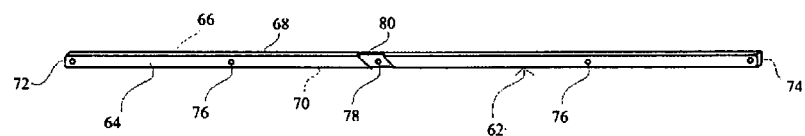
FIG. 4 is a perspective view of the tubular support member.
Figure 5:
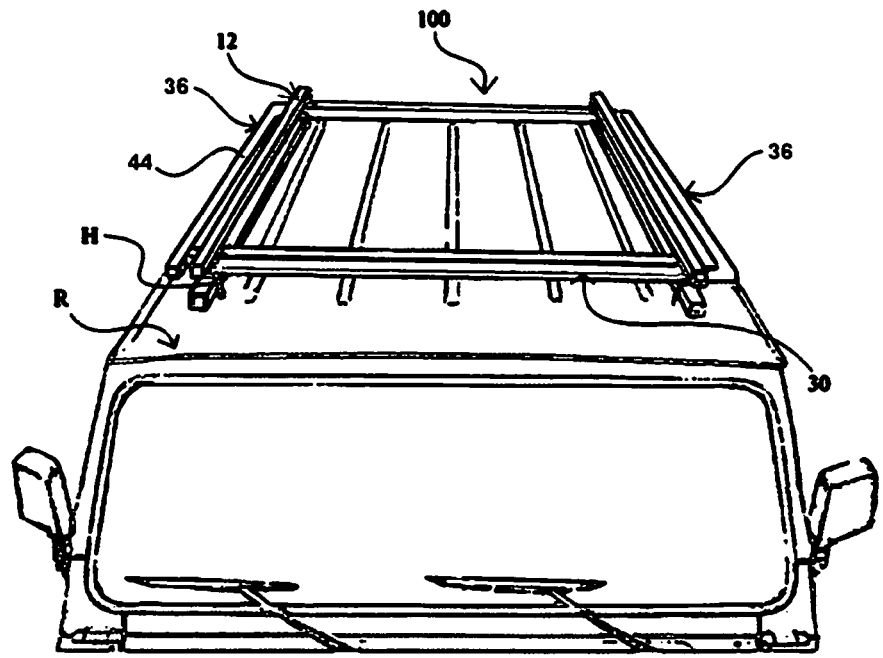
FIG. 5 is an environmental view of the versatile roof mounted cargo and recreation system mounted on a vehicle's hardtop roof.

Referring now to the drawings, it is seen that the versatile roof mounted cargo and recreation system The versatile roof mounted cargo and recreation system 100 is comprising of a framework 10, having a front end 14, an opposing back end 16, joined by a top side 18 and an opposing bottom side 20, the framework also having a left side 13 and an opposing right side 15, the framework comprising a plurality of tubular rail members 12, each tubular rail member having a first end 22, an opposing second end 24, joined by a top side 26 and an opposing bottom side 28. Each tubular rail member also having a plurality of securement holes 17.

The versatile roof mounted cargo and recreation system 100 also comprising a plurality of receiving tube members 30. Each receiving tube member 30 having a third end 32 and a fourth end 34. Receiving tube members 30 are positioned perpendicular to tubular rail members 12. At least two tubular rail members 12 are apart from each other at a distance that is approximately the length of receiving tube members 30 and are fastened to a vehicle roof R with common hardware H such as U-bolts and/or adjustable mounting brackets (not shown) to secure the framework 10 to vehicle roof R that are not flat. Receiving tube members 30 may be attached to tubular rail members by welding, bonding, or U-bolts.

The versatile roof mounted cargo and recreation system further comprising a plurality of arm/leg assemblies 36 each comprising a tubular arm member 38 having a fifth end 40 and a sixth end 42 and also having a tubular leg member 44 having a seventh end 46 and a eighth end 48. Each arm/leg assembly 36 is constructed such that the sixth end 42 of the arm member 38 is connected to the eighth end 48 of the leg member 44 at a right angle. Each leg member 44 having a plurality of securement holes 45.

The versatile roof mounted cargo and recreation system 100 further comprising a plurality of leg extension member 50 wherein the leg extension member 50 is telescoping and each leg extension member 50 comprising a tubular member 52 having a ninth end 54 and a tenth end 56, each leg extension member 50 also having a tubular receiving socket 58 attached to the leg extension member 50 in proximity of the tenth end 56 such that the receiving socket 58 is at a right angle to the tubular member 52. Each leg extension member 50 also having a plurality of securement holes 60.

The versatile roof mounted cargo and recreation system 100 further comprising a plurality of tubular support members 62. Each tubular support member 62 has a front side 64 and an opposing rear side 66, the tubular support members 62 also having a top side 68 and an opposing bottom side 70, and also having a eleventh end 72 and a twelfth end 74, and also having securement holes 76 passing from the front side 64 and through the rear side 66 proximate each end of the tubular support members 62 and having one securement hole 78 proximate 4/5 of the distance between the eleventh end 72 and the twelfth end 74 (securement hole 78 being slightly closer to the eleventh end 72 than to the twelfth end 74). The securement hole 78 is in the center of a diagonal cut-out section 80 of the tubular support member 62. The depth of the diagonal cut-out section 80 being approximately one-half of the dimension of the tubular support member 62 as measured from the top side 68 to the bottom side 70. The width of the diagonal cut-out section 80 being approximately the width of the tubular support member 62 as measured from the front side 64 to the rear side 66.

Figure 7:
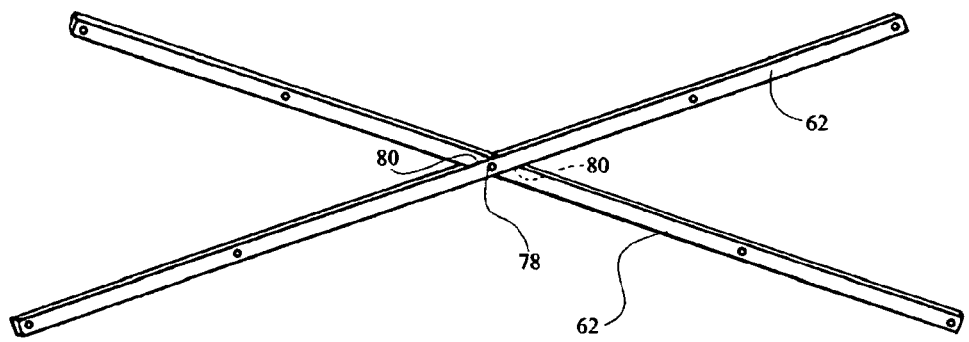
FIG. 7 is a perspective view of the tubular support members joined to form a cross-arm assembly.

FIG. 7 illustrates an example of multiple tubular support members 62 joined to form a cross-arm support assembly.

Figure 6:
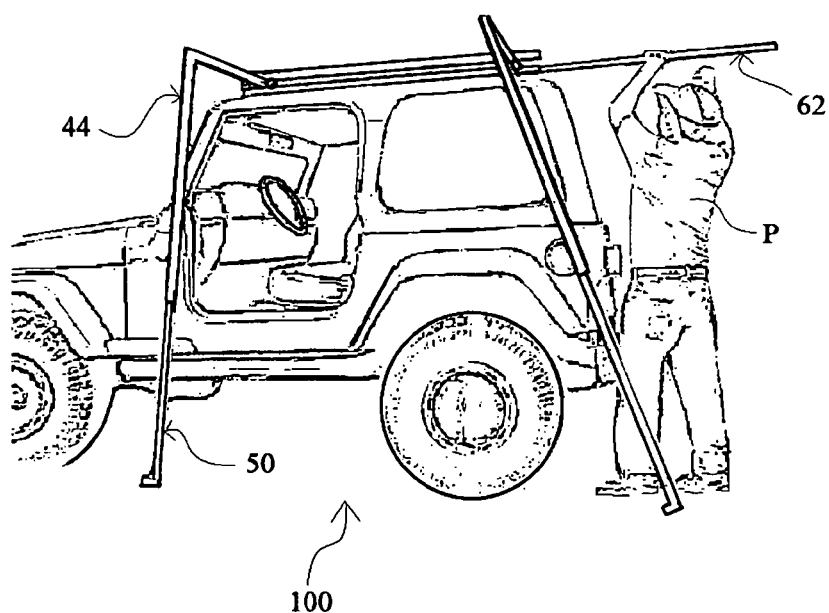
FIG. 6 is an environmental view illustrating the removal of tubular support members that are stored within the framework of the roof mount cargo and recreation system.
Figure 8:
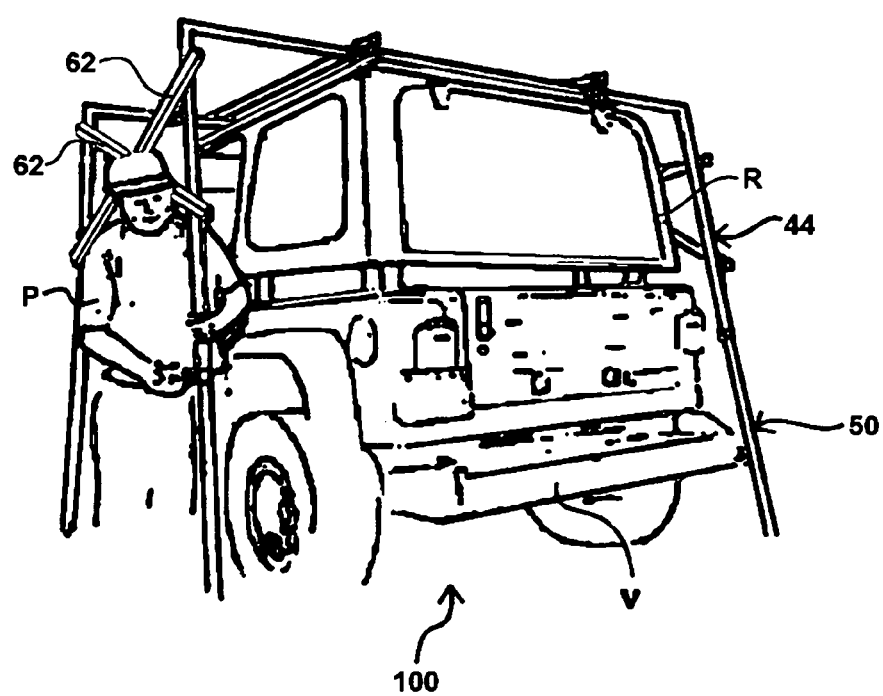
FIG. 8 is an environmental view of the versatile roof mounted cargo and recreation system assembled in a manner to lift and remove the hardtop from a vehicle.
Figure 9:
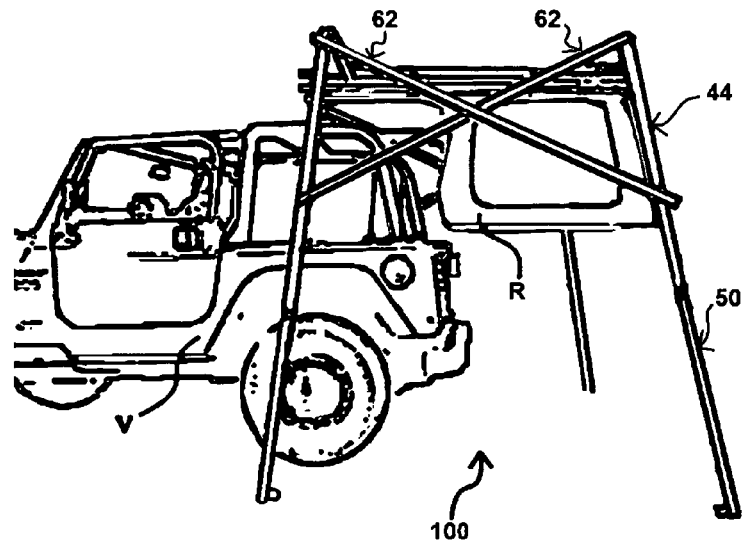
FIG. 9 is an environmental view of the versatile roof mounted cargo and recreation system illustrating the support and removal of a vehicles' removable hardtop.

FIG. 6, and FIG. 8 illustrate a person P easily converting the versatile roof mounted cargo and recreation system 100 to an architecture to support the lifting and removal of a vehicle's removable hardtop R by combining the framework 10, a plurality of arm/leg assemblies 36, a plurality of leg extension member 50, and a plurality of tubular support members 62. FIG. 9 illustrates the versatile roof mounted cargo and recreation system 100 supporting the removable hardtop R as it is removed from the vehicle V.

Figure 10:
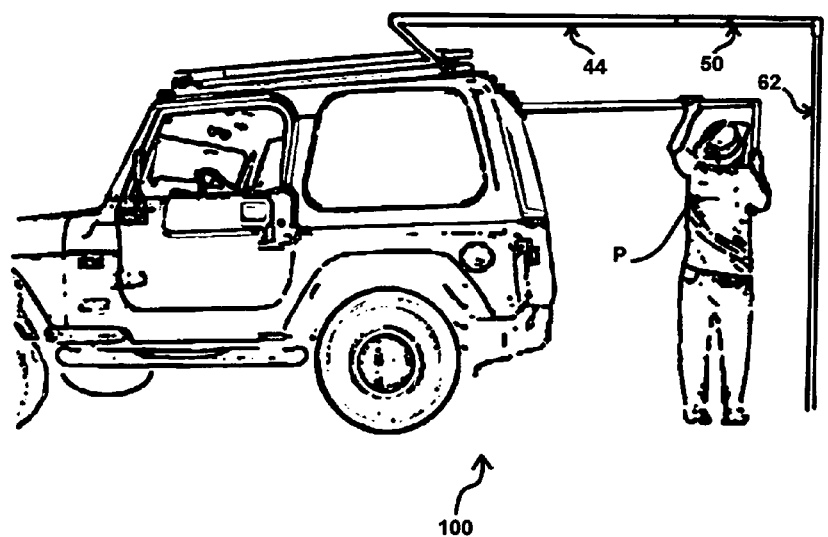
FIG. 10 is an environmental view of the versatile roof mounted cargo and recreation system assembled in a manner to support a canopy.

A person P can further arrange and combine components of the versatile roof mounted cargo and recreation system 100 to support a tarp or canopy as illustrated in FIG. 10.

While the invention has been particularly shown and described with reference to an embodiment thereof, it will be appreciated by those skilled in the art that various changes in form and detail may be made without departing from the spirit and scope of the invention.

The invention claimed is:

1. A versatile roof mounted cargo and recreation system comprising:
   a tubular frame that has a front end, an opposing back end, joined by a first side and an opposing second side, a top side and an opposing bottom side; and
   wherein, the tubular frame having a plurality of tubular rail members each having a first end and an opposing second end such that each tubular rail member extends longitudinally and horizontally forward from the back end to the front end of the tubular frame, wherein each tubular rail member having a longitudinal channel therethrough such that system components may be inserted into the first end of the longitudinal channels, and such that system components may be inserted into the second end of the longitudinal channels, wherein the tubular rail members provide storage for system components; and
   wherein the longitudinal channels of the tubular rail members support the movement and/or fixed position of the tubular frame as necessary for desired application as defined by the user; and
   wherein, the tubular frame having a plurality of arm receiving tube members, wherein the arm receiving tube members are attached to the tubular rail members; and
   wherein each arm receiving tube member having a third end and an opposing fourth end such that each arm receiving tube member extends longitudinally and horizontally from the first side to the second side of the tubular frame, wherein each arm receiving tube member having a longitudinal channel therethrough such that system components may be inserted into the third end of the longitudinal channels, and such that system components may be inserted into the fourth end of the longitudinal channels, wherein the arm receiving tube members provide storage for system components; and
   wherein the longitudinal channels of the arm receiving tube members support the movement and/or fixed position of the tubular frame as necessary for desired application as defined by the user; and
   wherein a first pair of arm receiving tube members is connected to tubular rail members proximate the front end of the tubular frame; and a second pair arm receiving tube members is connected proximate the back end of the tubular frame and additional singular arm receiving tube members and/or pairs arm receiving tube members may be attached to the tubular rail members between the first pair and the second pair of arm receiving tube members.

2. The versatile roof mounted cargo and recreation system as in claim 1 further comprising a plurality of arm/leg assemblies each comprising a tubular arm member having a fifth end and an opposing sixth end and also having a tubular leg member having a seventh end and an opposing eighth end such that the fifth end is connected to the seventh end at a right angle, forming an arm/leg assembly; wherein the arm/leg assemblies are positionable within the arm receiving tube members by rotating the tubular arm member within the arm receiving tube members in order to position the tubular leg member as necessary for desired application.

3. The versatile roof mounted cargo and recreation system as in claim 2 further comprising a plurality of leg extension assemblies wherein the leg extension is telescoping and each leg extension comprising:
   a tubular member having a ninth end and a tenth end such that the ninth end may be inserted into the eighth end of the leg member of the arm/leg assembly described in claim 2, and wherein the leg extension member having a tubular receiving socket attached to the leg extension member in proximity of the tenth end such that the receiving socket is at a right angle to the leg extension member.

4. The versatile roof mounted cargo and recreation system as in claim 1 further comprising a plurality of tubular support members, wherein tubular support members may be stowed within longitudinal channels; and
   wherein each tubular support member has a eleventh end and a twelfth end, a top side and an opposing bottom side, and also having a securement holes passing from the top side and through the bottom side; and wherein each tubular support member also having a diagonal cut-out section on the top side of the support member, wherein the width of the diagonal cut-out is approximately equal to the width of the tubular support member and the depth of the diagonal cut-out is approximately equal to one-half of the width of the tubular support member, wherein the center of the diagonal cut-out is slightly closer to the eleventh end and slightly farther from the twelfth end of the tubular support member, wherein one securement hole in located in the center of the diagonal cut-out.

5. Tubular support members as in claim 4 combined to form a support assembly, wherein a diagonal cut-out on the top side of a first tubular support member may be placed onto the diagonal cut-out on the top side of a second tubular support member, and wherein the first tubular support member may be secured to the second support member to form a cross-bar support assembly; wherein the cross-bar may be assembled such that eleventh end of a first tubular support member and the eleventh end of a second tubular support member comprise the top corners of the crossbar assembly, wherein the distance between the top corners of the cross-bar assembly are slightly less than the distance between the bottom corners of the cross bar assembly; and wherein tubular support members may be combined with additional tubular support members in configurations as necessary for desired application and support functions.

6. A versatile roof mounted cargo and recreation system as in claim 3 wherein the arm leg assemblies, and the leg extension assemblies may be arranged and secured in such positions to serve to support the lifting and removal of a vehicle's removable hardtop;

wherein a first arm/leg assembly may inserted into a first tube of the first pair of arm receiving tube members on the first side of the tubular frame and the first arm/leg assembly may be rotated such that the first leg member is in a downward positon; and wherein a second arm/leg assembly may be inserted into a third tube of the second pair arm receiving tube members on the first side of the tubular frame and the second arm/leg assembly may be rotated such that the second leg member is in a downward position; and wherein a first cross-bar support assembly as in claim 5 can be attached to the first leg member and also to the second leg member in such position that the arm members of the arm/leg assemblies are at a fixed distance apart from each other within the arm receiving members and the leg members taper to a greater distance at the eighth ends of the first leg member and the second leg member; and wherein a third arm/leg member may be inserted into a second tube of the first pair of arm receiving tube members on the second side of the tubular frame and a fourth arm/leg member may be inserted into a fourth tube of the second pair of arm receiving tube members on the second side of the tubular frame; and wherein the third and fourth leg members may be rotated downward; and wherein a second cross-bar support assembly can be attached to the third leg member and also to the fourth leg member in such position that the arm members of the arm/leg assemblies are at a fixed distance apart from each other within the arm receiving members and the leg members taper to a greater distance at the eighth ends of the third leg member and the fourth leg member; wherein the fixed position of the arm leg assemblies and the telescoping extendable leg extension members serves to support the lifting and removal of a vehicle's removable hardtop.

7. The versatile roof mounted cargo and recreation system as in claim 3 wherein the arm leg assemblies, and the leg extension assemblies may be arranged and secured in such positions to serve to support may be used to support a tarp or canopy;

wherein a first arm/leg assembly may inserted into a third arm receiving tube member proximate the back end on the first side of the tubular frame and rotated within a third arm receiving tube member such that the first leg member is in a horizontal position facing rearward of the tubular frame; and wherein a second arm/leg assembly may inserted into a fourth arm receiving tube member proximate the back end on the second side of the tubular frame and rotated within a fourth arm receiving tube member such that the second leg member is in a horizontal position facing rearward of the tubular frame such that the first leg member and the second leg member are parallel to each other; and wherein the fifth end of two leg extension members as described in claim 3 may be inserted into the horizontally positioned leg members in such a position that the leg extension tubular receiving sockets are facing downward; wherein tubular support members as in claim 4 may be inserted into the tubular receiving sockets of the leg extension members in order to support the first arm/leg assembly and the second arm/leg assembly in the horizontal position.

* * * * *